United States Patent [19]

Brock et al.

[11] Patent Number: 5,492,961
[45] Date of Patent: Feb. 20, 1996

[54] PHYSICALLY DRYING WATER-BASED COATING AGENTS AND USE THEREOF

[75] Inventors: Thomas Brock, Hürth; Klaus Wandelmaier, Wuppertal, both of Germany

[73] Assignee: Herberts Gesellschaft mit beschrankter Haftung, Wuppertal, Germany

[21] Appl. No.: 340,165

[22] Filed: Nov. 15, 1994

[30] Foreign Application Priority Data

Nov. 16, 1993 [DE] Germany .................. 43 39 085.4

[51] Int. Cl.$^6$ .................. C08J 3/00; C08K 3/20; C08L 51/00; C08F 8/30
[52] U.S. Cl. .................. 524/539; 524/504; 524/457; 524/507; 524/555; 524/591; 524/590; 524/839; 524/840; 525/123; 525/455
[58] Field of Search .................. 524/539, 591, 524/839, 840, 507, 555, 457, 504; 525/123, 455

[56] References Cited

U.S. PATENT DOCUMENTS

| 5,057,569 | 10/1991 | Biale | 524/457 |
| 5,401,795 | 3/1995 | Brock et al. | 524/539 |

Primary Examiner—Paul R. Michl
Assistant Examiner—Patrick Niland
Attorney, Agent, or Firm—Schweitzer Cornman & Gross

[57] ABSTRACT

The application relates to a binder for water-based coating agents, containing a mixture of a carbonate-containing polyurethane prepared by reacting (A)(i) a polyisocyanate containing no hydrophilic groups, (ii) a high molecular weight organic polyhydroxyl compound containing hydrophilic groups and polyhydroxy carbonates, (iii) a lower molecular weight compound containing at least two isocyanate-reacting groups, and (iv) an ionic compound containing at least one isocyanate-reacting hydrogen atom, with (B)(i) one or more polyurethanes prepared by free radical polymerization of a polyurethane macromonomer, in the presence of (ii) an unsaturated monomer copolymerizable with (i).

3 Claims, No Drawings

PHYSICALLY DRYING WATER-BASED COATING AGENTS AND USE THEREOF

BACKGROUND OF THE INVENTION

The invention relates to physically drying water-based coating agents, of use more particularly for single-colour or metallic-colour base layers of multi-layer lacquer coats.

Aqueous coating agents for producing base layers of multilayer coats are known. For example EP-A-0 089 497 describes water-dilutable coating agents based on polyurethane dispersions produced by a specified construction method from polyether diols and/or polyester diols, diisocyanates, compounds containing two groups which react with isocyanate and at least one anionic group, diamines and/or polyamines. These coating agents are stoved at an elevated temperature of e.g. 130° to 150° C., optionally after coating with a covering lacquer.

In industry and trade, however, there is a need for physically drying coating agents, suitable more particularly for repair lacquering of various substrates such as metal articles, particularly in the motor-vehicle sector, or for lacquering of machines. The coating agents required for these purposes must dry or harden at room temperature or with slight heating, e.g. to up to 60° C.

Water-based physically drying coating agents of this kind, suitable e.g. for repair lacquering of motor vehicles, are known e.g. from DE-A-41 15 015 and DE-A-41 15 042. However, the coating agents described therein and based on polyurethane binders have disadvantages in multi-layer structures, compared with conventional solvent-containing base lacquers. More particularly the total structure has inadequate hardness.

DE-A-41 22 265 describes polyurethane dispersions which, after conversion into the aqueous phase, are suitable for producing metallic and single-colour base lacquers. The main disadvantages of these coating agents are their inadequate hardness in multi-layer structures and their watertightness, which is inadequate under the conditions of vehicle repair lacquering.

DE-A-39 36 794 describes polyurethane polyureas and use thereof as binders in aqueous metallic base lacquers. The binders contain chemically incorporated carbonate groupings. Base lacquers on this basis, however, as compared with solvent-based base lacquers, have inadequate hardness in the total structure, particularly when covered with conventional clear lacquers.

SUMMARY OF THE INVENTION

The aim of the invention is to provide a binder system for water-based physically drying coating agents which, particularly as base lacquers in multi-layer structures, have properties equal to those of conventional base lacquers (solvent-based) particularly regarding hardness and watertightness, and are thus superior to known aqueous systems.

DETAILED DESCRIPTION OF THE INVENTION

This aim is achieved by a water-based binder, i.e. a mixture of

A) 5 to 50 wt. % of one or more polyurethanes containing carbonate groupings and with a number average molecular weight (Mn) of 70000–500000 and in the form of an aqueous dispersion obtainable by reaction of a) 10 to 40 wt. % of one or more organic polyisocyanates containing no hydrophilic groups or groups convertible into hydrophilic groups, b) 40 to 80 wt. % of one or more higher-molecular organic polyhydroxyl compounds containing no hydrophilic groups or-groups convertible into hydrophilic groups and made up of at least 50 wt. % of one or more polyhydroxy polycarbonates, c) 0.2 to 18 wt. % of one or more lower-molecular compounds containing at least two groups which react with isocyanate groups but not containing any hydrophilic groups or groups convertible into hydrophilic groups, d) 1 to 12 wt. % of one or more compounds containing at least one ionic group or at least one group convertible into an ionic group together with at least one hydrogen atom capable of reacting with isocyanate groups and e) 0 to 8 wt. % of one or more non-ionic hydrophilic compounds containing at least one isocyanate group or at least one group capable of reacting with isocyanate groups and B) 50 to 95 wt. % of one or more polyurethanes having a number average molecular weight (Mn) of 30000 to 500000 and in the form of an aqueous dispersion, obtainable by radically initiated polymerisation of one or more polyurethane macromonomers with a content of carboxylic, phosphonic acid and/or sulphonic acid groups and lateral vinyl groups in the presence of one or more unsaturated monomers copolymerisable with the polyurethane macromonomers, the percentage weights of components A) and B) each relating to the binder solids and adding up to 100 wt. %.

The invention also relates to aqueous coating agents containing 8 to 20 wt. % of one or more of the binders according to the invention, 60 to 90 wt. % water, 0 to 15 wt. % of one or more organic solvents and 0.1 to 20 wt. % of one or more decorative pigments and/or colouring pigments, and neutralising agents for giving the neutralisable groups in the binder a neutralisation coefficient of 40 to 120%, together with optional conventional additives and auxiliary substances.

The coating agents according to the invention contain a binder component A) in the form of one or more polyurethanes containing carbonate groupings. These polyurethanes can optionally also contain urea groupings, i.e. they can be polyurethane ureas.

Preferably, the polyurethanes used as component A) contain at least 200 milliequivalents per 100 g solids of chemically incorporated carbonate groupings —O—CO—O—. Preferably they contain not more than a total of 320 milliequivalents per 100 g solids of chemically incorporated urethane groupings —NH—CO—O and optionally chemically incorporated urea groupings —NH—CO—NH—. Examples of such usable polyurethanes are described in DE-A-39 36 794.

Component A) is obtainable by reacting the previously defined components a), b), c), d) and optionally e). Component a) is used in a proportion of 10 to 40 wt. %, preferably 15 to 35 wt. %, in each case relating to the solids content of component A). Typical examples of usable organic polyisocyanates are multi-functional isocyanates such as aliphatic, cyclo-aliphatic and/or aromatic polyisocyanates with at least two isocyanate groups per molecule and a molecular weight of 112 to 1000, preferably 140 to 400. The functional group therein is preferably two isocyanate groups, symmetrically or asymmetrically disposed in the molecule. isomers or isomer mixtures of organic diisocyanates are preferred. The aromatic diisocyanates can be phenylene diisocyanate, toluylene diisocyanate, xylylene diisocyanate, biphenylene diisocyanate, naphthylene diisocyanate or diphenyl methane diisocyanate.

Owing to their good resistance to ultraviolet light, (cyclo) aliphatic diisocyanates yield products with little tendency to yellowing. The following are examples thereof: isophorone diisocyanate, cyclopentylene diisocyanate or the hydrogenation products of aromatic diisocyanates such as cyclohexylene diisocyanate, methyl cyclohexylene diisocyanate or dicyclohexyl methane diisocyanate. Aliphatic diisocyanates are compounds having the formula $$O=C=N-(CR_2)_r-N=C=O$$

in which r is an integer from 2 to 20, particularly 6 to 8 and R, which can be the same or different, denotes hydrogen or a low alkyl radical with 1 to 8 carbon atoms, preferably 1 or 2 carbon atoms. The following are examples: trimethylene diisocyanate, tetramethylene diisocyanate, pentamethylene diisocyanate, hexamethylene diisocyanate, propylene diisocyanate, dimethyl ethylene diisocyanate, methyl trimethylene diisocyanate or trimethyl hexane diisocyanate. Aliphatic diisocyanates with an aromatic ring, such as tetramethyl xylylene diisocyanate, can also be used. isophorone diisocyanate and dicyclohexyl methane diisocyanate are particularly preferred. The polyisocyanate component for forming the prepolymer can also contain a proportion of higher-valency polyisocyanates, provided they are not adversely affected by gelling. In the case of triisocyanates, good results have been obtained with products produced by trimerisation or oligomerisation of diisocyanates or by reaction of diisocyanates with compounds containing polyfunctional OH or NH groups, such as the biuret of hexamethylene diisocyanate and water, the isocyanurate of hexamethylene diisocyanate or the adduct of isophorone diisocyanate to trimethylol propane.

The average functionality can optionally be reduced by adding monoisocyanates. Phenyl isocyanate, cyclohexyl isocyanate and stearyl isocyanate are examples of such chain-breaking monoisocyanates.

The component b) for producing the binder component A) is used in proportions of 40 to 80 wt. %, preferably 45 to 75 wt. %, in each case relative to the total solids in component A). Component b) preferably comprises organic polyhydroxyl compounds with a molecular weight of 300 to 5000, preferably 500 to 3000, the component b) making up at least 50 wt. %, preferably more than 70 wt. % of polyhydroxy polycarbonates in the aforementioned molecular-weight range. These structural components, which are important for the invention, are esters of carbonic acid obtained by reaction of diols with carbonic acid derivatives such as diphenyl carbonate or phosgene. Examples of such diols are ethylene glycol, propanediol-1,2 and -1,3, butanediol-1,4 and -1,3, hexanediol-1,6, octanediol- 1,8, neopentyl glycol, 1,4-bishydroxymethyl cyclohexane, 2-methyl-1,3-propanediol, 2,2,4-trimethyl pentanediol-1,3, diethylene glycol, tri- and tetra-ethylene glycol, dipropylene glycol, polypropylene glycol, dibutylene glycol, polybutylene glycols, bisphenol A or tetrabromobisphenol A. Preferably the diol component contains 40 to 100 wt. % hexanediol, preferably hexanediol-1,6 and/or hexanediol derivatives, preferably substances containing terminal OH groups together with ether or ester groups, e.g. products obtained by reaction of 1 mol of hexanediol with one or more mol, preferably 1 to 2 mol of caprolactone as per DE-AS 17 70 245 or by etherification of hexanediol with itself to form di- or trihexylene glycol. Manufacture of these derivatives is known e.g. from DE-AS 15 70 540. Very advantageously also, use can be made of the polyether polycarbonate diols described in DE-A-37 17 060.

The hydroxy polycarbonates should be substantially straight-chain. If required, however, they can be made slightly branched by incorporation of polyfunctional components, particularly low-molecular polyols such as glycerol, trimethylol propane, hexanetriol-1,2,6, butanetriol-1,2,4, trimethylol propane, pentaerythritol, guinitol, mannitol, sorbitol, methyl glycoside or 1,4,3,6-dianhydrohexitol.

In addition to these polyhydroxy polycarbonates, the structure component b) can contain other polyhydroxyl compounds known per se in polyurethane chemistry and within the aforementioned molecular-weight range, e.g.

1. the dihydroxy polyesters, known per se in polyurethane chemistry, of dicarboxylic acids such as succinic acid, adipic acid, suberic acid, azelaic acid, sebacic acid, isophthalic acid, terephthalic acid, tetrahydrophthalic acid etc. and diols such as ethylene glycol, propanediol-1,2, propanediol-1,3, diethylene glycol, butanediol-1,4, hexanediol-1,6, octanediol-1,8, neopentyl glycol, 2-methyl propanediol-1,3 or the various isomeric bishydroxy methyl cyclohexanes;
2. the polylactones known per se in polyurethane chemistry, such as the polymers of epsilon caprolactone started on the aforementioned dihydric alcohols, or
3. the polyethers known per se in polyurethane chemistry, such as the polymers or copolymers of tetrahydrofuran, styrene oxide, propylene oxide, ethylene oxide, butylene oxide or epichlorohydrin, particularly propylene oxide and optionally ethylene oxide, produced by using divalent starter molecules such as water, the aforementioned diols or amines containing 2NH bonds. A proportion of ethylene oxide is optionally added, provided that the resulting polyether diol contains not more than 10 wt. % of ethylene oxide units.

Preferably use is also made of polyether diols obtained without using ethylene oxide, i.e. more particularly with exclusive use of propylene oxide and tetrahydrofuran.

Component c) is also used in the manufacture of the binder component A). Component c) is used in proportions of 0.2 to 18 wt. %, preferably 0.5 to 10 wt. % relative to the solids in component A). The component c) comprises low-molecular, at least difunctional compounds containing hydroxyl and/or amino groups, known per se in polyurethane chemistry and with molecular weights of 60 to 400. During isocyanate addition, they are used as chain-lengtheners (when using difunctional compounds) or as cross-linking agents (when using trifunctional or multi-functional compounds) and are constructed so that the functional groups are connected via aliphatic, alicyclic or aromatic radicals. For example, proportions up to 30 wt. % of the total polyol constituents, preferably about 2 to 20 wt. %, can be used. Examples of usable low-molecular polyols and polyamines are given hereinafter.

Advantageously the low-molecular polyols contain up to 20 carbon atoms in the molecule, e.g. ethylene glycol, diethylene glycol, triethylene glycol, 1,2-propanediol, 1,3-propanediol, 1,4-butanediol, 1,2-butylene glycol, 1,6-hexanediol, trimethylol propane, castor oil or hydrogenated castor oil, di-trimethylol propane ether, pentaerythritol, 1,2-cyclohexane dimethanol, bisphenol A, bisphenol F, neopentyl glycol, hydroxypivalic acid neopentyl glycol ester, hydroxyethylated or hydroxypropylated bisphenol A, hydrogenated bisphenol A or mixtures thereof.

Polyamines are substantially alkylene polyamines containing 1 to 30 carbon atoms, preferably about 2 to 12 carbon atoms. They can carry substituents which do not contain any hydrogen atoms capable of reacting with isocyanate groups, e.g. in the case of polyamines with straight-chain or branched aliphatic, cycloaliphatic or aromatic structure and at least two primary amino groups. The following diamines may be cited: ethylene diamine, propylene diamine, 1,4-butylene diamine, piperazine, 1,4-cyclohexyl dimethyl amine, hexamethylene diamine, 1,6, trimethyl hexamethylene diamine, methane diamine, isophorone diamine, 4,4'-diamino dicyclohexyl methane or amino ethyl ethanolamine. Alkyl or cycloalkyl diamines such as propylene diamine or 1-amino-3-amino methyl 3,5,5-trimethyl cyclohexane are preferred diamines. The chain can also be lengthened with hydrazine, or alternatively with substituted hydrazides such as monoalkyl or monoacryl hydrazide, or bishydrazides such as adipic acid-bis-hydrazide.

The chain can be lengthened at least partly with a polyamine containing at least three amino groups comprising a reactive hydrogen atom. This type of polyamine can be used in a proportion such that after lengthening the polymer, unreacted amine nitrogen atoms are present and contain one or two reactive hydrogen atoms. Diethylene triamine, tetraethylene tetra-amine, dipropylene triamine and dibutylene triamine are examples of such usable polyamines. Alkyl or cycloalkyl triamines such as diethylene triamine are preferred polyamines. To prevent gelling during chain-lengthening, small proportions of monoamines such as ethyl hexyl amine can also be added.

The component d) for producing the binder component A) is used in proportions of 1 to 12 wt. %, preferably 1.5 to 6 wt. %. Component d) comprises compounds containing two H-active groups reacting with isocyanate groups and at least one group capable of forming anions. Hydroxyl groups and primary and/or secondary amino groups are particularly suitable for reacting with isocyanate groups. Carboxyl, sulphonic-acid and/or phosphonic acid groups are capable of forming anions. Carboxylic or carboxylated groups are preferably used. They should be sufficiently inert for the isocyanate groups of the diisocyanate to react preferentially with the hydroxyl groups in the molecule. Alkanoic acids with two substituents on the carbon atom in the alpha position are preferably used. The substituent can be a hydroxyl group, an alkyl group or an alkylol group. These polyols have at least one or usually one to three carboxyl groups in the molecule. They contain 2 to about 25, preferably 3 to 10 carbon atoms. Dihydroxy propionic acid and dihydroxy benzoic acid are examples of these compounds. One particular group of dihydroxy alkanoic acids comprises the alpha, alpha-dimethylol alkanoic acids characterised by the structural formula

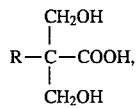

in which R=hydrogen or an alkyl group with up to about 20 carbon atoms. 2,2-dimethylol acetic acid, 2,2-dimethylol butyric acid and 2,2-dimethylol pentanoic acid are examples of such compounds. The preferred dihydroxy alkanoic acid is 2,2-dimethylol propionic acid. The following are examples of amino group-containing compounds: alpha, beta-diaminovaleric acid, 3,4-diaminobenzoic acid, 2,4-diaminotoluene sulphonic acid and 2,4-diamino-diphenyl ether sulphonic acid. The polyol containing carboxyl groups can make up 3 to 100 wt. %, preferably 5 to 50 wt. %, of the total polyol constituent in the NCO prepolymer.

The proportion of ionisable carboxyl groups

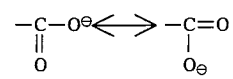

available in salt form through neutralisation of the carboxyl groups is usually at least 0.4 wt. %, preferably at least 0.17 wt. %, relative to the solids, in the final polyurethane. The upper limit is about 6 wt. %. The proportion of dihydroxy alkanoic acids in the final neutralised polyurethane corresponds to an acid number of at least 5, preferably at least 10. The upper limit of the acid number is about 60, preferably about 40, relative to the solids.

The proportion of component d) and the neutralisation coefficient of the ionic groups incorporated using the component d) are chosen so that the finally obtained polyurethane contains 0 to 120, preferably 1 to 80 milliequivalents of ionic groups per 100 g solids, the total quantity of ethylene oxide units and ionic groups within the stated ranges being such that the polyurethane polyureas are dispersible in water.

Optionally component e) can also be used to construct the binder component A). The proportion of component e) is preferably 0 to 8 wt. %, particularly preferably 0.5 to 6 wt. % relative to the solids in component A).

The hydrophilic structural component e) preferably comprises compounds containing ethylene oxide units incorporated in polyether chains, i.e.

e1) Diisocyanates and/or compounds which are difunctional as regards the isocyanate polyaddition reaction and comprising hydrogen atoms capable of reacting with isocyanate groups and with lateral polyether chains containing ethylene oxide units, e2) Monoisocyanates and/or compounds which are monofunctional as regards the isocyanate polyaddition reaction and comprising hydrogen atoms which react with isocyanate groups and contain polyether chains comprising ethylene oxide units, or mixtures of compounds e1) and e2). The component A) used in binders according to the invention has a number average molecular weight (Mn) of 70000 to 500000, preferably 80000 to 300000.

Component B) of the binder according to the invention comprises one or more polyurethanes obtainable by radically initiated polymerisation of polyurethane macromonomers with a content of carboxyl, phosphonic acid or sulphonic acid groups and lateral vinyl groups, e.g. in an unsaturated monomer serving as solvent and copolymerisable with the polyurethane macromonomer, optionally in the presence of other copolymerisable unsaturated monomers, or by radically initiated polymerisation of the polyurethane monomers in a mixture of water and an organic solvent inert towards isocyanate groups, in the presence of unsaturated monomers copolymerisable with the polyurethane macromonomers, the organic solvent optionally being distilled off before or after radical polymerisation. The polyurethanes occur in the form of an aqueous dispersion.

The polyurethane dispersions can be produced in various ways. In a first method, for example, a polyaddition product is produced by polyaddition of polyhydroxy compounds from the group comprising polyhydroxy polyethers, polyhydroxy polyesters or polyhydroxy polycarbonates, also polyhydroxy carboxylic acids, dihydroxy phosphonic acids or polyhydroxy sulphonic acids, or polyisocyanates and a monomer containing at least two hydroxy or at least one vinyl group. The proportions of the reactants, particularly of polyisocyanate, are chosen so as to obtain a macromonomer with terminal hydroxyl groups. This macromonomer, which also contains carboxyl or sulphonic acid groups and lateral vinyl groups, is converted into an aqueous dispersion and then polymerised via the vinyl groups with copolymerisable unsaturated monomers and with radical-forming initiators, yielding the polyurethane dispersion, in which case the polyurethane also carries hydroxyl groups.

In a second method, by way of example, in contrast to the first-mentioned method, the proportions of polyisocyanate are chosen so as to obtain a macromonomer with terminal isocyanate groups. The free isocyanate groups are then reacted with primary or secondary amines, alcohols or thio-alcohols. The thus-modified macromonomer is then polymerised, likewise via the vinyl groups, with copolymerisable unsaturated monomers and with radical-forming initiators.

In a third method, for example, as in the second variant, a polyaddition product is produced by reaction of polyhydroxyl compounds from the group comprising polyhydroxy polyethers, polyhydroxy polyesters or polyhydroxy polycarbonates and polyhydroxy carboxylic acids, dihydroxy phosphonic acids or polyhydroxy sulphonic acids and polyisocyanates, together with a monomer containing at least one vinyl group and at least two hydroxy groups. As before, an excess of polyisocyanates is taken, so that the resulting macromonomer contains lateral vinyl groups, carboxyl, phosphonic acid or sulphonic acid groups and terminal isocyanate groups. This macromonomer is then reacted with a monomer which contains a vinyl group and also a group which reacts with isocyanate groups, e.g. the hydroxyl, amine or mercapto group. These monomers can be used either alone or mixed with primary or secondary amines, alcohols, or thio-alcohols. The result is a macromonomer containing lateral vinyl groups and terminal vinyl groups. This monomer is then polymerised in the last stage, likewise via the vinyl groups, with copolymerisable unsaturated monomers and with radical-forming initiators.

In a fourth variant of the method, for example, the monomer carrying the carboxyl, phosphonic-acid or sulphonic-acid group is first incorporated in the previously-formed macromonomer. In this variant, a polyaddition product is first formed from polyhydroxy polyethers, polyhydroxy polyesters or polyhydroxy carbonates, polyisocyanates and monomers, which contain at least one vinyl group and at least two hydroxyl groups. As before, a molar excess of polyisocyanate is taken, so that the resulting macromonomer contains terminal isocyanate groups. In addition, the macromonomer contains lateral vinyl groups.

Alternatively the intermediate product formed can be given a lengthened chain, if the isocyanate groups in this polyaddition product are reacted with diamine carboxylic acids or diamine sulphonic acids. As before, the final stage is radically initiated polymerisation of the vinyl groups with copolymerisable unsaturated monomers.

The preferred method is as follows: the dihydroxy vinyl compound is not incorporated simultaneously with the polyol during polyaddition, but firstly a prepolymer consisting only of polyol, polyisocyanate and optionally polyhydroxy acid is reacted to obtain a prepolymer terminating in OH or NCO. In the second stage the polymer is then reacted with the dihydroxy vinyl compound and with additional polyisocyanate to obtain the macromonomer terminating in OH or NCO and containing the vinyl groups.

The polyhydroxyl polyethers are compounds having the formula

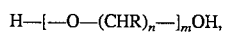

in which
R denotes hydrogen or a low alkyl radical, optionally with various substituents,
n is a number from 2 to 6 and
m is a number from 10 to 120.

Poly(oxytetramethylene) glycols, poly(oxyethylene) glycols and poly(oxypropylene) glycols are examples. The preferred polyhydroxy polyethers are poly(oxypropylene) glycols with a molecular weight in the range from 400 to 5000.

The polyhydroxy polyesters are produced by esterification of organic polycarboxylic acids or their anhydrides with organic polyols. The polycarboxylic acids and the polyols can be aliphatic or aromatic.

The polyols used in the manufacturing process include alkylene glycols such as ethylene glycol, butylene glycol, neopentyl glycol and other glycols such as diethylol cyclohexane, or trishydroxy alkyl alkanes such as trimethylol propane, or tetrakis hydroxyalkyl alkanes such as pentaerythritol.

The acid component of the polyester consists mainly of low-molecular polycarboxylic acids or their anhydrides with 2 to 18 carboxylic acids in the molecule. The following are examples of suitable acids: phthalic acid, isophthalic acid, terephthalic acid, tetrahydrophthalic acid, hexahydrophthalic acid, succinic acid, adipic acid, azelaic acid, sebacic acid, maleic acid, glutaric acid, hexachloro heptanoic dicarboxylic acid, tetrachlorophthalic acid, trimellitic acid and pyromellitic acid. Alternatively the anhydrides of these acids can be used, if they exist. Dimeric and trimeric fatty acids can also be used as polycarboxylic acids.

The starting compounds can also be polycarbonate polyols or polycarbonate diols having the general formula

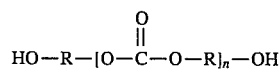

n=number of units for obtaining the desired molecular weight.

In this formula, R denotes an alkylene radical. These OH-functional polycarbonates can be produced by reacting polyols such as propanediol-1,3, butanediol-1,4, hexanediol-1,6, diethylene glycol, triethylene glycol, 1,4-bis-hydroxymethyl cyclohexane, 2,2-big (4-hydroxycyclohexyl)-propane, neopentyl glycol, trimethylol propane or pentaerythritol with dicarbonates such as dimethyl, diethyl or diphenyl carbonate or phosgene. Mixtures of these polyols can also be used.

With regard to the polyurethane dispersions, it is particularly important that the macromonomers giving rise to these dispersions should contain lateral vinyl groups and optional terminal vinyl groups. "Terminal vinyl groups" means vinyl groups which are suspended from the beginning or end of the polymer chain, whereas lateral vinyl groups are incorporated not at the beginning or end of the polymer chain but in between.

The lateral vinyl groups in the polyurethane dispersions are obtained by incorporation in the macromonomer of monomers which comprise at least two hydroxyl groups and at least one vinyl group. The following are examples: trimethylol propane (TMP) derivatives such as TMP-monoallyl ether (2-propenyl-oxy- 2-hydroxymethyl propanol), TMP-mono(meth)-acrylate(2-(meth) acryloyloxy-2-hydroxymethyl propanol; glycerol mono(meth) acrylate; adducts of alpha, beta-unsaturated carboxylic acids such as (meth)-acrylic acid to diepoxides such as bisphenol A-diglycidyl ether or hexanediol diglycidyl ether; adducts of dicarboxylic acids such as adipic acid, terephthalic acid or the like to (meth)acrylic acid glycidyl esters or monovinyl ethers of polyols.

The polyurethane macromonomers are manufactured by the conventional methods known in urethane chemistry. The catalysts can be tertiary amines such as triethyl amine, dimethyl benzyl amine, diazo bicyclo-octane or dialkyl tin (IV) compounds such as dibutyl tin dilaurate, dibutyl tin dichloride or dimethyl tin dilaurate. The reaction occurs more particularly in the presence of a solvent or in the presence of a "reactive diluent" The solvents can be substances which can later be removed by distillation, e.g. methyl ethyl ketone, methyl isobutyl ketone, acetone, tetrahydrofuran, toluene or xylene. These solvents can be partly or completely distilled off after manufacture of the polyurethane macromonomers or after radical polymerisation. Use can also be made of water-dilutable high-boiling solvents, e.g. N-methyl pyrrolidone, which will then remain in the dispersion. The reactive diluents are alpha, beta-unsaturated monomers which are copolymerised in the end stage with the macromonomers containing vinyl groups. The following are examples of reactive diluents: alpha, beta-unsaturated vinyl monomers such as alkyl acrylates, methacrylates or crotonares with 1 to 20 carbon atoms in the alkyl radical, di-, tri- and tetra-acrylates, methacrylates or crotonates of glycols, tri- and tetrafunctional alcohols, substituted and unsubstituted acryl and methacryl amides, vinyl ethers, alpha, beta-unsaturated aldehydes and ketones, vinyl alkyl ketones with 1 to 20 carbon atoms in the alkyl radical, vinyl ethers, vinyl esters, diesters of alpha, beta-unsaturated dicarboxylic acids, styrene and styrene derivatives such as alpha-methyl styrene.

The resulting macromonomers are then neutralised, unless the acid groups in the monomers bearing such groups have already been used in neutralised form.

Neutralisation is by means of aqueous solutions of alkali-metal hydroxides or with amines such as trimethyl amine, triethyl amine, dimethyl aniline, diethyl aniline, triphenyl amine, dimethyl ethanolamine, amino methyl propanol, dimethyl isopropanol amine or ammonia. Neutralisation can also be brought about with mixtures of amines and ammonia.

In order to produce the polyurethane dispersions used as component B) the macromonomers obtained and containing vinyl groups are converted by addition of water into an aqueous dispersion and polymerised by radically initiated polymerisation, using known methods. During the polymerisation reaction, if "reactive diluents" are not present beforehand, monomers of the kind previously described are added and are then incorporated in the polyurethane.

The acid number of these polyurethane dispersions is in the range from 5 to 80 mg KOH/g, preferably 10 to 40 mg KOH/g. The number average molecular weight (Mn) is about 30000 to 500000, preferably about 50000 to 250000. The proportion of units not originating from the polyurethane macromonomers is over 5 wt. %, preferably over 15 wt. % relative to the weight of the final total resin.

The coating agents according to the invention contain 8 to 20 wt. %, relative to the total coating agent, of the binder containing components A) and B).

The water content of the coating agents according to the invention is 50 to 90 wt. %, preferably 60 to 85 wt. %. In order to improve the flow properties, film formation and metallic effect, 1 to 20 wt. %, preferably 6 to 15 wt. % of one or more solvents, relative to the total amount of coating agent, can be present.

The solvents can be organic solvents conventionally used in the lacquer sector as lacquer solvents and/or additives to aqueous coating agents.

The following are suitable examples: aromatic solvents such as xylene, esters such as butyl acetate, glycol ethers such as ethylene glycol monobutyl ether (butyl glycol), alcohols such as butanol or aliphatic hydrocarbons such as white spirit.

The coating agents according to the invention are particularly suitable for producing decorative and nacreous or single-colour base-lacquer layers.

In the case of metallic pigments, preferably use is made of 0.3 to 4 wt. % of one or more metallic pigments relative to the total coating agent. The metallic pigments can be conventional metal platelets or metal-scale pigments, such as metal bronzes, e.g. aluminium pigments such as aluminium bronzes.

Other decorative pigments can be used, e.g. interference pigments such as titanium dioxide-coated or iron-oxide coated mica, coated aluminium pigments or graphite pigments.

In addition to effect pigments, the coating agents can contain other colouring pigments. Colouring pigments are exclusively present for producing single-colour lacquer layers. The pigments also include conventional organic or inorganic fillers, such as are familiar to those skilled in the lacquer sector.

The following are examples of inorganic or organic colour pigments or fillers: titanium dioxide, micronised titanium dioxide, iron oxide pigments, carbon black, silicon dioxide, barium sulphate, micronised mica, talcum, azo pigments, phthalocyanine pigments, quinacridone or diketo pyrrolopyrrole pigments.

The coating agents according to the invention contain neutralising agents for partial neutralisation of neutralisable groups. The neutralisation coefficient of neutralisable groups is preferably 40 to 120% of the neutralisable groups and is preferably below 100%.

The neutralising agents for acid groups can be conventional bases in the lacquer sector, such as the previously-mentioned amines, ammonia or alkanol amines such as N,N-dimethyl ethanolamine.

The solvents according to the invention optionally contain conventional additives and auxiliary substances as used in the lacquer sector. These additives and auxiliary substances are thickeners, additives for influencing the flow properties, anti-foaming agents, levelling agents, inhibitors (e.g. for inhibiting gassing of aluminium pigments), dispersants and wetting additives.

The additives and auxiliary substances are used in normal proportions, familiar to the skilled man, depending on the desired effect.

The coating agents according to the invention can be applied to various substrates by conventional methods, e.g. by spraying, painting or doctor blade. The substrate can be various materials such as metal, plastics, wood, glass or others.

The coating agents according to the invention are physically drying, i.e. they need no storing and can be dried e.g. at temperatures of the order of 15° to 60° C.

The coating agents according to the invention, after application, can be coated with top lacquers, more particularly transparent top lacquers. The top lacquers can be applied wet-on-wet, after brief ventilation or after drying the base lacquer layer applied according to the invention. The top lacquer layer can be dried together with the layer of lacquer coating according to the invention. The top lacquers can be conventional lacquers more particularly transparent lacquers, as conventionally used in the motor-vehicle sector. The lacquers are mainly solvent-based, but water-based top lacquers can also be used.

As previously mentioned, the coating agents according to the invention can be used on a wide variety of substrates. They are particularly suitable for producing base lacquers in multi-layer structures. The preferred application is to lacquering of motor vehicles or parts thereof. Owing to the advantageous physical drying, the coating agents according to the invention are particularly suitable for repair lacquering or as a repair lacquer.

Alternatively they can be used in stoving systems of the kind conventional in lacquering of mass-produced vehicles.

By comparison with other known aqueous coating agents used as base lacquer, the coating agents according to the invention, used in a multi-layer structure, produce a very hard overall structure and have excellent resistance to water. The properties attained are comparable with those of solvent-containing base lacquers.

The following examples will illustrate the invention:

Example of manufacture 1

Polyurethane dispersion A 850 parts of a polycarbonate from hexanediol-1,6 (prepared by reaction of hexanediol-1,6 and diphenyl carbonate; hydroxyl number 56, molecular weight about 2000), 67.5 parts of a monofunctional polyether alcohol with OH number 26, prepared by alkoxylation of n-butanol using a mixture of 83% ethylene oxide and 17% propylene oxide, 21.4 parts of 2,2-bishydroxymethyl propionic acid (DMPS) and 22.5 parts butanediol-1,4 were reacted at 100° C. with a mixture of 151.2 parts of 1,6-diisocyanatohexane (HDI) and 199.8 parts of 3-isocyanatomethyl-3,5,5-trimethyl cyclohexyl isocyanate (IPDI) to obtain a prepolymer containing about 5% of free isocyanate groups. The prepolymer was dissolved in 2440 parts of acetone and the solution was cooled to 50° C.

A solution of 19.8 parts ethylene diamine and 7.5 parts hydrazine hydrate was prepared in 500 parts of water. The solution was added slowly, with thorough agitation, to the prepolymer solution, resulting in a thinly flowing cloudy-white solution. Next, 13.4 parts of N,N-dimethyl ethanolamine were added. 1525 parts of deionised water were then added with strong agitation, resulting in an opaque blue-white dispersion of the solids. The acetone in the dispersion was removed by distillation in vacuo, leaving a purely aqueous dispersion containing 40% solids.

The solids in the dispersion contained the following (mEq-%= milliequivalent percentage per 100 g solids):

410 mEq-% carbonate groups (—O—CO—O)

148 mEq-% urethane groups (—NH—CO—O—)

95 mEq-% urea groups (—NH—CO—NH)

243 mEq-% urethane and urea groups

Example of manufacture 2

Polyurethane dispersion B 249.8 g of a polyester prepared from neopentyl glycol, hexanediol-1,6, isophthalic and adipic acid and with a hydroxyl number of 37 and an acid number below 3 were dissolved with reflux in 150 g acetone together with 24.7 dimethylol propionic acid and 9.3 g butanediol-1,4. Next, 0.1 g of 2,6-di-tert. butyl-4-methyl phenol and 16.6 g glycerol monomethacrylate were added and homogenised. After addition of 134.2 g tetramethyl xylylene diisocyanate, the mixture was agitated at reflux temperature until the isocyanate content was 1.08 wt. % relative to the total weighed amount.

15.5 g of diethanolamine were quickly added to the resulting prepolymer solution and homogenised for 30 minutes. After metered addition of 13.1 g triethylamine, 1108 g of water at a temperature of 80° C. were added to the polymer solution with intensive agitation. The solvent acetone was then removed by vacuum distillation from the resulting dispersion. After addition of 51.1 g methyl methacrylate the temperature was raised to 80° C., and agitation was continued for a further 30 minutes. Next, 10 vol. % of an ammonium peroxide sulphate solution consisting of 0.8 g ammonium peroxide sulphate and 50 g water was added at 80° C. The remaining quantity of ammonium peroxide sulphate solution was added at a metered rate during 30 minutes. The temperature was kept at 78° to 80° C. for a further 2 hours.

After cooling to room temperature the dispersion was adjusted to a solids content of 30% and filtered through a 5mm filter. The resulting dispersion had a pH of 7.46.

Example of manufacture 3

Production of metallic water-based lacquers

The previously-prepared dispersions A and B were used to make aqueous metallic base lacquers containing the following:

| | |
|---|---|
| 25.5* | parts of dispersion B + 10 parts of dispersion A |
| 46.1* | parts water |
| 7.2 | parts n-butanol |
| 4.0 | parts butyl glycol |
| 0.5 | parts N-methyl pyrrolidone |
| 0.3 | parts of a commercial corrosion inhibitor for preventing gassing of aluminium |
| 2.1 | parts of a commercial thickener |
| 0.2 | parts of N,N-dimethyl ethanolamine and |
| 4.1 | parts of a commercial aluminium paste, 60% Al. |

The resulting metallic base lacquers had a viscosity of about 30 s (DIN beaker, 4 mm nozzle, 23° C.) and were diluted with about 10% water to obtain the spray viscosity of about 20 s. The dispersions were used to apply lacquer coats as follows:

Lacquer structure on metal sheets, to which values were assigned:

Smooth-ground car-body sheet metal

Conventional 1K polyvinyl butyral primer

Conventional 2K-PU filler

Water-based lacquer

Conventional 2K-PU filler, medium solid type, 47% solids

Alternatively aqueous adhesive primers and fillers can be used.

Application and drying of the covering lacquer layer (base lacquer and clear lacquer):

Application of water-based lacquer by spraying 30 minutes drying at room temperature Application of clear lacquer (spraying)

10 minutes ventilation at room temperature 30 minutes drying at 60° C.

Notes:

Parts=parts by weight

2K=Two components

PU=Polyurethane

Example of manufacture 4

Production of single-colour water-based lacquers

The previously prepared dispersions A and B were used to make aqueous single-colour base lacquers containing the following:

| | |
|---|---|
| 35.5* | parts of dispersions A and B |
| 21.1* | parts water |
| 12.1 | parts butyl glycol |
| 1.3 | parts of a commercial thickener |
| 0.14 | parts N,N-dimethyl ethanolamine |
| 22.1 | parts of a commercial titanium dioxide pigment |
| 0.5 | parts of a commercial copper phthalocyanine pigment |
| 0.16 | parts of a commercial anti-foaming agent and |
| 8.1 | parts of a commercial PU paste auxiliary substance (30% solids) |

In each case, dispersions containing about 40% solids; when the solids content was lower, the quantities of dispersion and water were adjusted accordingly, so that usable coating agents with the same solids content were obtained in all cases.

The resulting single-colour base lacquers had a viscosity of about 40 to 50 seconds (DIN beaker, 4 mm nozzle, 23° C.) and were diluted with about 10 to 15% water to obtain the spray viscosity of about 20 sec.

The single-colour base lacquers were used for coating as per Example of manufacture 3.

For comparison, a commercial solvent-containing base lacquer based on acrylate/cellulose acetobutyrate was applied in the corresponding lacquer structure as described.

The properties of the resulting lacquer coats are shown in the following Table:

| | Scratch resistance 1) | | Hardness 2) | Resistance to water | |
|---|---|---|---|---|---|
| | Metallic | single-colour white | Single-colour white | Metallic | single-colour white |
| Water-based lacquer based on: | | | | | |
| Dispersion A | 2–3 | 3 | 30 um | 1 | 1–2 |
| Dispersion B | 1 | 2 | 16 um | 2–3 | 3 |
| Dispersion A + B | 1–2 | 2 | 18 um | 1–2 | 2 |
| Solvent-containing base lacquer | 1–2 | 2 | 15 um | 1–2 | 2 |

1)
1 - Very good?
2 - Good?
3 - Useful in some cases?
4 - Useless?
2) Micropenetration hardness after Vickers at 250 mN (Measuring instrument: HV 100 produced by Messrs. Fischer/Sindelfingen)

We claim:

1. Binders suitable for water-based coating agents and containing a mixture of:
    A) 5.to 50 wt. % of one or more polyurethanes containing carbonate groupings and with a number average molecular weight (Mn) of 70000–500000 and in the form of an aqueous dispersion obtained by reaction of
        a) 10 to 40 wt. % of one or more organic polyisocyanates containing no hydrophilic groups or groups convertible into hydrophilic groups,
        b) 40 to 80 wt. % of one or more higher-molecular organic polyhydroxyl compounds containing no hydrophilic groups or groups convertible into hydrophilic groups and made up of at least 50 wt. % of one or more polyhydroxy polycarbonates,
        c) 0.2 to 18 wt. % of one or more low-molecular compounds containing at least two groups which react with isocyanate groups but not containing any hydrophilic groups or groups convertible into hydrophilic groups,
        d) 1 to 12 wt. % of one or more compounds containing at least one ionic group or at least one group convertible into an ionic group together with at least one hydrogen atom capable of reacting with isocyanate groups and
        e) 0 to 8 wt. % of one or more-non-ionic hydrophilic compounds containing at least one isocyanate group or at least one group capable of reacting with isocyanate groups and
    B) 50 to 95 wt. % of one or more polyurethanes having a number average molecular weight (Mn) of 30000 to 500000 and in the form of an aqueous dispersion, obtained by radically initiated polymerisation of one or more polyurethane macromonomers with a content of carboxylic, phosphonic acid and/or sulphonic acid groups and lateral vinyl groups in the presence of one or more unsaturated monomers copolymerisable with the polyurethane macromonomers,
the percentage weights of components A) and B) each relating to the binder solids and adding up to 100 wt. %.

2. An aqueous coating agent in which the binder is a mixture of:
    A) 5 to 50 wt. % of one or more polyurethanes containing carbonate groupings and with a number average molecular weight (Mn) of 70000–500000 and in the form of an aqueous dispersion obtained by reaction of
        a) 10 to 40 wt. % of one or more organic polyisocyanates containing no hydrophilic groups or groups convertible into hydrophilic groups,
        b) 40 to 80 wt. % of one or more higher-molecular organic polyhydroxyl compounds containing no hydrophilic groups or groups convertible into hydrophilic groups and made up of at least 50 wt. % of one or more polyhydroxy polycarbonates,
        c) 0.2 to 18 wt. % of one or more lower-molecular compounds containing at least two groups which react with isocyanate groups but not containing any hydrophilic groups or groups convertible into hydrophilic groups,
        d) 1 to 12 wt. % of one or more compounds containing at least one ionic group or at least one group convertible into an ionic group together with at least one hydrogen atom capable of reacting with isocyanate groups and
        e) 0 to 8 wt. % of one or more non-ionic hydrophilic compounds containing at least one isocyanate group or at least one group capable of reacting with isocyanate groups and
    B) 50 to 95 wt. % of one or more polyurethanes having a number average molecular weight (Mn) of 30000 to 500000 and in the form of an aqueous dispersion, obtained by radically initiated polymerisation of one or more polyurethane macromonomers with a content of carboxylic, phosphonic acid and/or sulphonic acid groups and lateral vinyl groups in the presence of one or more unsaturated monomers copolymerisable with the polyurethane macromonomers, the percentage weights of components A) and B) each relating to the binder solids and amounting to 100 wt. %.

3. An aqueous coating agent according to claim 2, characterised in that it contains 8 to 20 wt. % of one or more of the binders in claim 1, 60 to 90 wt. % water, 0 to 15 wt. % of one or more organic solvents and 0.1 to 15 wt. % of one or more decorative pigments and/or colouring pigments, and neutralising agents for giving the neutralisable groups in the binder a neutralisation coefficient of 40 to 120%.

* * * * *